Patented Sept. 8, 1953

2,651,662

UNITED STATES PATENT OFFICE 2,651,662

TREATMENT OF PENTAERYTHRITOL MOTHER LIQUOR

Edward J. Russell, Allentown, Pa., assignor to Trojan Powder Company, a corporation of New York No Drawing. Application January 6, 1951, Serial No. 204,817

7 Claims. (Cl. 260—615)

This invention relates to the method of reducing the materials in pentaerythritol mother liquor to non-tacky solid form convenient for shipment and to the products so produced.

The usual commercial process for making pentaerythritol (P. E.) includes the condensation of acetaldehyde and formaldehyde in contact with an alkaline condensing agent such as aqueous calcium hydroxide slurry or aqueous sodium hydroxide solution. After this reaction is completed, the liquor produced is concentrated by evaporation and then cooled, to form P. E. crystals. The concentration and crystallization are repeated until there is obtained a mother liquor from which P. E. cannot be crystallized and which is practically a waste product.

This remaining aqueous mother liquor from the crystallization is a syrup that contains many compounds. It contains a metal formate, either calcium or sodium formate depending upon the particular alkali originally used in the condensation reaction. It contains polyhydroxy compounds other than pentaerythritol. It contains in addition some pentaerythritols which are pentaerythritol itself and the di-, tri-, and higher pentaerythritols. Because of the high water content, this liquid cannot be shipped economically. When evaporated to dryness, it gives a product that on cooling is a dark semiplastic material with a tacky surface difficult to handle and remove from the shipping containers.

I have now discovered that, by heating this semiplastic material at elevated temperatures for a relatively short period of time a new material is formed which cools to a hard, brittle, non-tacky mass easily pulverized to a free flowing powder. This free flowing powder may be conveniently shipped in suitable containers. It has been proven to have excellent anti-lumping characteristics even after standing. I have found it to have a lower hydroxyl group content than the dried solid material of the original mother liquor. I have further discovered that by varying the temperature and changing the length of the cook I may control the extent of conversion of the mother liquor to form products that are different but are always of hydroxyl group content lower than the original material.

My invention comprises the method of and the product resulting from heating aqueous pentaerythritol mother liquor at a temperature above the boiling point of water as at 100°–130° C. until substantially all the water originally present is removed, raising the temperature of the resulting mixture to 175°–270° C. and then cooking this dehydrated mixture until a specimen removed and cooled is a hard brittle non-tacky substance. In one embodiment the invention comprises also heating the non-tacky material so made until the hydroxyl content falls below 22%. The heating within the range of 175° to 270° C. is accompanied by the evolution of water and small amounts of other volatile material. The evolution of water is considered to be due to an inner reaction, to give a product of increased molecular weight, so that upon cooling I obtain a new substance which is a hard brittle mass instead of the tacky semiplastic material ordinarily obtained when the P. E. mother liquor is evaporated to dryness at a temperature of 100°–130° C. I find the hydroxyl content of my new product to be in the range of 9%–22% as compared to a hydroxyl value of approximately 25% in the dried solid matter of the original waste liquor. I also find that my process causes a portion of the semiplastic material to become water insoluble although the original mother liquor is completely soluble in water.

To investigate this reaction further, I carefully evaporated a sample of mother liquor to dryness at the usual temperature of 100°–130° C. After the water had been removed, the liquor was agitated and the temperature increased to 170° C. over a period of 45 minutes. The cooking was then continued at about 170° C. for five hours. Upon cooling a normal tacky semiplastic mass was obtained having a hydroxyl value of 23.3%. I then heated another portion of this sample and held it at a temperature of 200° C. for two hours and upon cooling, the product was a hard brittle mass having a hydroxyl value of 20.5%.

Regardless of the exact mechanism of my reaction, it is a fact that the reaction proceeds smoothly and with a negligible loss of material except for the water and small amounts of other volatile material evolved. The reaction gives products having a hydroxyl value lower than that of the starting material.

As to the starting material used in my method, the mother liquor is that finally obtained from crystallization, usually repeated crystallization, of pentoerythritol in the usual manufacturing process described. The material is ordinarily a dark colored liquor of the consistency of a thin syrup. It contains normally about 50% water. A representative specimen gave the following approximate analysis:

| | Percent |
|---|---|
| Water | 50 |
| Polyhydroxy compounds other than pentaerythritols | 25 |
| Metal formate, mostly calcium with some magnesium formate | 14 |
| Pentaerythritol, dipentaerythritol and other pentaerythritols | 11 |

In the table and elsewhere herein proportions are expressed as parts by weight unless otherwise specified.

The hydroxyl content of pentoerythritol itself is approximately 50%. The hydroxyl content of the syrup solids derived by careful evaporation to dryness of the mother liquor of the composition described is about 25% of the weight of the total solids.

Dehydration of the aqueous pentoerythritol mother liquor, to remove the water present therein, is carried out by placing the liquor in a suitable evaporator and heating it to a temperature at which water is boiled away at a reasonably rapid rate under the prevailing pressure. Although such temperature is not critical, I obtain the best results in commercial operation when the temperature of the mixture is maintained between 100°–130° C. This heating is continued until a sample taken from the batch cools to form a very thick semiplastic material.

After the water has been removed, the temperature of the liquor is found to increase rapidly with a constant amount of heat being applied to the liquor.

As to the time for the reaction or second step within the critical range of 175° to 270° C., the period of heating at the temperature chosen for the reaction is determined by taking representative samples from the batch at intervals and determining when the degree of reaction has progressed to the extent desired in the final product. This involves determination of the remaining hydroxyl content of the samples by a standard method. Once this period of time has been determined for a given composition of pentaerythritol mother liquor, other batches may be processed at the same temperature for the predetermined period and the heating then discontinued without waiting for the analysis for hydroxyl content to be completed.

In those cases in which the hydroxyl content of the finished product is unimportant and the primary consideration is merely to form a dry free flowing powder for shipping purposes, heating within the critical temperature range is continued until a sample taken from the batch cools to form a hard brittle substance easily pulverized to a free flowing powder.

The initial dehydration and subsequent cooking of my method may be carried out in one piece of equipment. The temperature may be raised rapidly, to hasten the evaporation of water and bring the mass to the reaction stage. However, I find that the reaction proceeds more smoothly and is more easily controlled when the original evaporation is carried out at a moderated rate.

My method is ordinarily carried out at atmospheric pressure and under an atmosphere of ordinary air. Pressures above or below atmospheric may however be used. A stream of inert gas such as carbon dioxide or nitrogen may also be passed through the reaction mixture to carry off the water liberated during the reaction.

After the reaction is completed, the mixture is poured into cooling pans and allowed to set. When cool the product is hard and brittle showing no signs of being tacky.

This product may be easily pulverized into a free flowing powder conveniently packaged in suitable containers. Upon standing it exhibits excellent anti-lumping characteristics.

These higher condensation products are useful in reactions with higher fatty acids, to make varnish esters with exceptionally good bodying times and whose films gave very good drying times.

In a modification of the invention, I remove a portion of the calcium in the mother liquor prior to subjecting such liquor to my reaction on heating. This removal is conveniently effected by treating the liquor with sulfuric acid in an amount less than that theoretically required to precipitate all of the calcium therein as calcium sulfate. The calcium sulfate is filtered off and the filtrate treated with oxalic acid to remove the last traces of calcium. The calcium oxalate is then filtered off to give a liquor substantially free from both calcium and sulfuric acid.

The invention will be further illustrated by description in connection with the following examples:

Example 1

A representative sample to P. E. waste liquor was heated at atmospheric pressure until the temperature of the material had reached about 130° C. and the water had been largely removed from the P. E. waste liquor. The P. E. waste liquor was agitated and the temperature increased to 200° C. over a period of 80 minutes. The material was cooked at this temperature, and after a period of 1½ hours it became very stringy and began to lose its liquor characteristics. It was poured out of the container into pans and allowed to cool to room temperature. The cooled material was a dark, brittle solid which could be readily pulverized to obtain a free-flowing, non-lumping tan powder having an hydroxyl value of 21.1%.

Example 2

A representative sample of P. E. waste liquor was heated at atmospheric pressure until the temperature of the material had reached about 130° C. and the water had been largely removed from the P. E. waste liquor. The P. E. waste liquor was agitated and the temperature increased to 270° C. over a period of 90 minutes. The material was cooked at this temperature and after a period of 10 minutes the material became very viscous and tended to solidify. After 30 minutes the material became so thick it could not readily be stirred. It was allowed to cool to room temperature. The cooled material was a dark, brittle, somewhat porous solid which could be readily pulverized to obtain a free-flowing, non-lumping dark brown powder having an hydroxyl value of 9.3%.

Example 3

A representative sample of P. E. waste liquor was treated with sufficient oxalic acid and sulfuric acid to precipitate the calcium, present as the formate salt in the P. E. waste liquor, as calcium sulfate and calcium oxalate. The precipitated calcium insoluble salts were removed by filtration and the filtrate was then heated at atmospheric pressure until the temperature of the material had reached about 130° C., and the water and formic acid had been largely removed from the P. E. waste liquor. The P. E. waste liquor was then agitated and the temperature increased to 230° C. over a period of 120 minutes. The material was cooked at this temperature for a period of 1½ hours. It was then poured out of the container into pans and allowed to cool to room temperature. The cooled material was a dark, brittle solid which could be reaidly pulverized to obtain a free-flowing, non-lumping tan powder having an hydroxyl value of 12.3%.

Example 4

A representative sample of P. E. waste liquors which had been heated to boil off the water and then cooked for about 1 hour at an average temperature of 190° C., cooled, pulverized to a free-flowing, non-lumping tan powder having an hydroxyl value of 20.5% was weighed and placed in a Wiley extractor. This material was then extracted with hot water until the extracting liquor was colorless. The original sample was found to contain 15.5% of material not soluble in hot water.

It will be understood that it is intended to cover all changes and modifications of the examples of the invention herein chosen for the purpose of illustration which do not constitute departures from the spirit and scope of the invention.

What I claim is:

1. In preparing non-tacky pulverizable material from a water soluble semiplastic tacky dehydrated pentaerythritol mother liquor, the method which comprises heating the semiplastic tacky dehydrated material at a temperature of 175° to 270° C., separating water as liberated during heating, continuing such heating and water separation at such elevated temperature for a short period of time until a sample taken from the batch and cooled forms a hard brittle substance containing a minor proportion of material insoluble in water and having a substantially lower hydroxyl content than that of a sample of the original mother liquor which has been reduced to a semiplastic tacky mass by heating at a temperature of 100° to 130° C.

2. The method of claim 1 in which the heating is continued until the hydroxyl content of the resulting product falls to within the range 9% to 22% of such mixture.

3. In preparing non-tacky pulverizable solid material from water soluble pentaerythritol mother liquor, the method which comprises heating the mother liquor at a temperature of approximately 100° to 130° C. to expel water present in the solution, continuing such heating until a sample taken from the batch and cooled forms a thick semiplastic material, then heating the remaining material to a temperature within the range 175° to 270° C., continuing the heating and separating the water liberated within the said range for a short period of time until a sample taken from the batch and cooled forms a hard brittle substance containing a minor proportion of material insoluble in water and having a substantially lower hydroxyl content than that of the solid material in the original mother liquor after it is reduced to dryness by heating at a temperature of 100° to 130° C., and then discontinuing the said heating.

4. The method of claim 3 in which the heating and water separation within the range 175° to 270° C. is continued until the hydroxyl content of the resulting product falls to a value of 9% to 22% of said mixture.

5. The method of claim 3 in which the mother liquor is pretreated to remove metal formate before the liquor is heated, the pretreatment being effected by adding sulfuric acid to the pentaerythritol mother liquor in amount less than that theoretically required to precipitate all calcium therein as calcium sulfate, filtering off the calcium sulfate, adding to the filtrate oxalic acid in amount required to precipitate the last of the calcium, and then filtering off the resulting calcium oxalate, the final filtrate being substantially free from sulfuric acid and calcium.

6. As a composition of matter, the non-tacky pulverizable heat reaction product of polyhydroxy compounds of pentaerythritol mother liquor containing not more than about 11% pentaerythritol, dipentaerythritol and other pentaerythritols, the product being of hydroxyl content 9% to 22% and being produced by the method of claim 1.

7. The method described in claim 3 in which the heating step at a temperature of 175°–270° C. does not exceed about 2 hours.

EDWARD J. RUSSELL.

References Cited in the file of this patent

UNITED STATES PATENTS

| Number | Name | Date |
|---|---|---|
| 1,716,110 | Burke | June 4, 1929 |
| 2,533,737 | Mertz | Dec. 12, 1950 |